United States Patent
Hu et al.

(10) Patent No.: US 11,424,687 B2
(45) Date of Patent: Aug. 23, 2022

(54) SWITCHING CONTROL CIRCUIT, SWITCHING CONTROL METHOD AND FLYBACK CONVERTER THEREOF

(71) Applicant: Silergy Semiconductor Technology (Hangzhou) LTD, Hangzhou (CN)

(72) Inventors: Zhiliang Hu, Hangzhou (CN); Qiukai Huang, Hangzhou (CN); Xinlei Li, Hangzhou (CN); Yongjiang Bai, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 99 days.

(21) Appl. No.: 16/910,258

(22) Filed: Jun. 24, 2020

(65) Prior Publication Data

US 2021/0006172 A1 Jan. 7, 2021

(30) Foreign Application Priority Data

Jul. 5, 2019 (CN) .................. 201910605333.X

(51) Int. Cl.
*H02M 3/335* (2006.01)
*H02M 1/08* (2006.01)

(52) U.S. Cl.
CPC ......... *H02M 3/33592* (2013.01); *H02M 1/08* (2013.01)

(58) Field of Classification Search
CPC .. H02M 3/33592; H02M 1/08; H02M 1/0009; H02M 1/0025; H02M 1/0058; H02M 7/217; Y02B 70/10

See application file for complete search history.

(56) References Cited

U.S. PATENT DOCUMENTS

| | | |
|---|---|---|
| 5,528,481 A | 6/1996 | Caldeira et al. |
| 8,310,846 B2 | 11/2012 | Piazzesi |
| 8,917,068 B2 | 12/2014 | Chen et al. |
| 9,331,588 B2 | 5/2016 | Chen |
| 9,762,113 B2 | 9/2017 | Chen et al. |
| 2014/0192565 A1* | 7/2014 | Wang ................ H02M 3/33592 363/21.14 |
| 2015/0078041 A1 | 3/2015 | Huang |
| 2015/0311810 A1 | 10/2015 | Chen et al. |
| 2016/0072399 A1* | 3/2016 | Kikuchi ............ H02M 3/33523 363/21.14 |
| 2016/0261200 A1* | 9/2016 | Yabuzaki ................ H02M 1/32 |
| 2017/0047853 A1 | 2/2017 | Chen et al. |
| 2017/0155335 A1* | 6/2017 | Chang ..................... H02M 1/08 |
| 2018/0175738 A1* | 6/2018 | Kikuchi .................. H02J 1/102 |
| 2019/0149052 A1 | 5/2019 | Gong et al. |

* cited by examiner

*Primary Examiner* — Kyle J Moody

(57) ABSTRACT

A switching control circuit for a flyback converter having a main switch coupled to a primary winding of a transformer and a rectifier switch coupled to a secondary winding of the transformer, can include: a first voltage generating circuit configured to generate a first voltage sampling signal representing information of an input voltage; a synchronous rectification control circuit configured to adjust an on-time of the rectifier switch according to the first voltage sampling signal in order to adjust an absolute value of a negative current flowing through the secondary winding; and where the negative current is configured to discharge a parasitic capacitor of the main switch in order to reduce a drain-source voltage of the main switch.

18 Claims, 4 Drawing Sheets

SWITCHING CONTROL CIRCUIT, SWITCHING CONTROL METHOD AND FLYBACK CONVERTER THEREOF

RELATED APPLICATIONS

This application claims the benefit of Chinese Patent Application No. 201910605333.X, filed on Jul. 5, 2019, which is incorporated herein by reference in its entirety.

FIELD OF THE INVENTION

The present invention generally relates to the field of power electronics, and more particularly to switching control circuits and methods, and associated flyback converters.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Figure 1:
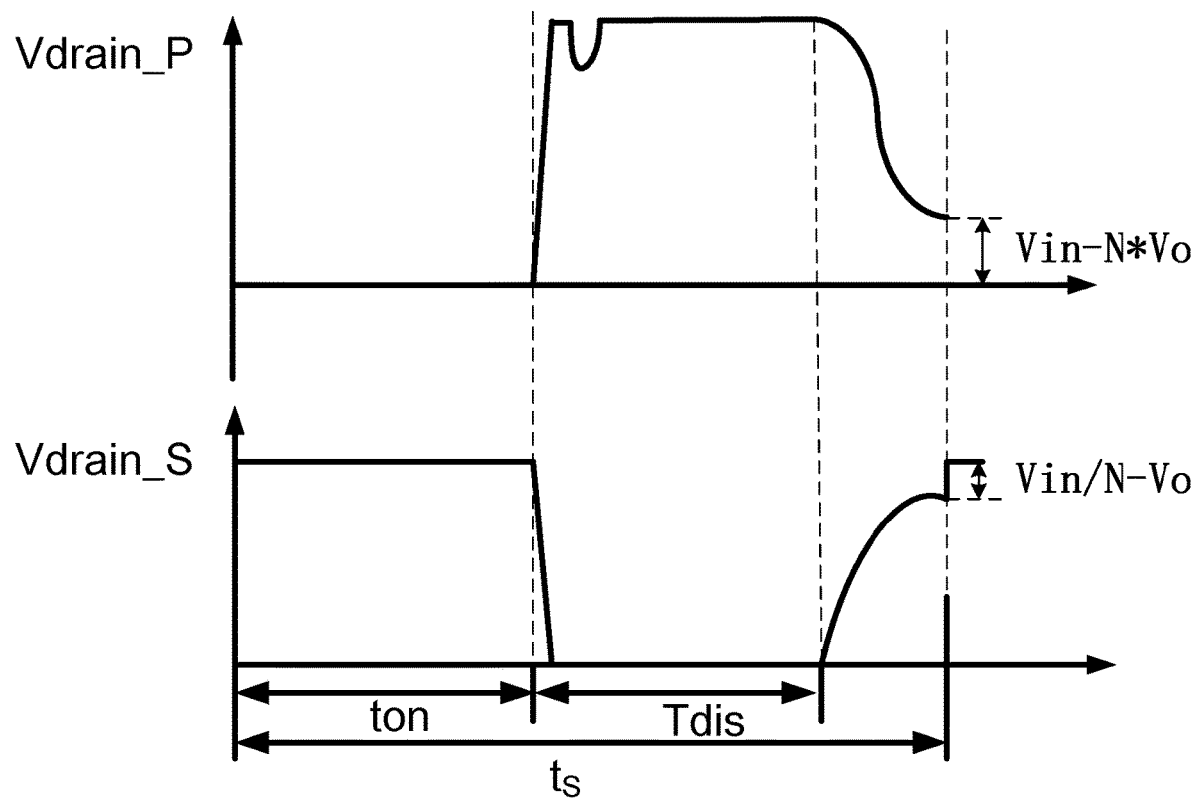
FIG. 1 is a waveform diagram of example quasi-resonance of a flyback converter.

Referring now to FIG. 1, shown is a waveform diagram of example quasi-resonance of a flyback converter. When a flyback converter works in a quasi-resonant (QR) state, resonance occurs between a magnetizing inductor of a transformer and a parasitic capacitor of a main switch in the primary side at the end of a secondary current freewheeling. As shown, in order to reduce the loss of the main switch, the main switch may typically be turned on when drain-source voltage Vdrain_P of the main switch is at the bottom; that is, the main switch is turned on when drain-source voltage Vdrain_P drops to its lowest point. However, the lowest point of drain-source voltage Vdrain_P is Vin−N*Vo, where Vin is the input voltage of the flyback converter, Vo is the output voltage of the flyback converter, and N is the turns ratio of the primary and the secondary sides of the transformer. Vin−N*Vo is high when Vin is high or N*Vo is low, and the lowest point of drain-source voltage Vdrain_P is still relatively large when the main switch is turned on. At this time, turning on the main switch can cause a large switching loss, and the large switching loss can make it difficult for the main switch to function at a high switching frequency.

When the secondary side operates in a synchronous rectification state, the conduction time of a rectifier switch in the secondary side can be controlled to increase, such that a negative current flowing in the reverse direction may be generated after the secondary current freewheeling ends, and then the rectifier switch can be turned off. The secondary current can be transferred to the primary side to discharge the parasitic capacitor of the main switch when the rectifier switch is turned off, thereby reducing the drain-source voltage of the main switch when the main switch is turned on and achieving zero-voltage switch (ZVS).

If the negative current is relatively small, the zero-voltage switch may not be achieved in the primary side, and the switching loss may remain large. If the negative current is large, a large loop current can be generated in the primary side, which also can affect the efficiency. Therefore, the negative current should be controlled to an appropriate value, in order to improve the efficiency optimally. In one control approach the drain-source voltage of the rectifier switch can be detected and compared against a fixed reference, but this may not guarantee that the zero-voltage switch will be achieved under different input voltages. When the input voltage is low, the negative current is large, which may result in large loop current. When the input voltage is large, the negative current is small, and the main switch is turned on when the drain-source voltage of the main switch is still high, which may result in a large switching loss.

In one embodiment, a switching control circuit for a flyback converter having a main switch coupled to a primary winding of a transformer and a rectifier switch coupled to a secondary winding of the transformer, can include: (i) a first voltage generating circuit configured to generate a first voltage sampling signal representing information of an input voltage; (ii) a synchronous rectification control circuit configured to adjust an on-time of the rectifier switch according to the first voltage sampling signal in order to adjust an absolute value of a negative current flowing through the secondary winding; and (iii) where the negative current is configured to discharge a parasitic capacitor of the main switch in order to reduce a drain-source voltage of the main switch.

In one embodiment, a switching control method for a flyback converter having a main switch coupled to a primary winding of a transformer and a rectifier switch coupled to a secondary winding of the transformer, can include: (i) generating a first voltage sampling signal representing information of an input voltage; (ii) adjusting an on-time of the rectifier switch according to the first voltage sampling signal to adjust an absolute value of a negative current flowing through the secondary winding; and (iii) discharging, by the negative current, a parasitic capacitor of the main switch to reduce a drain-source voltage of the main switch.

Figure 2:
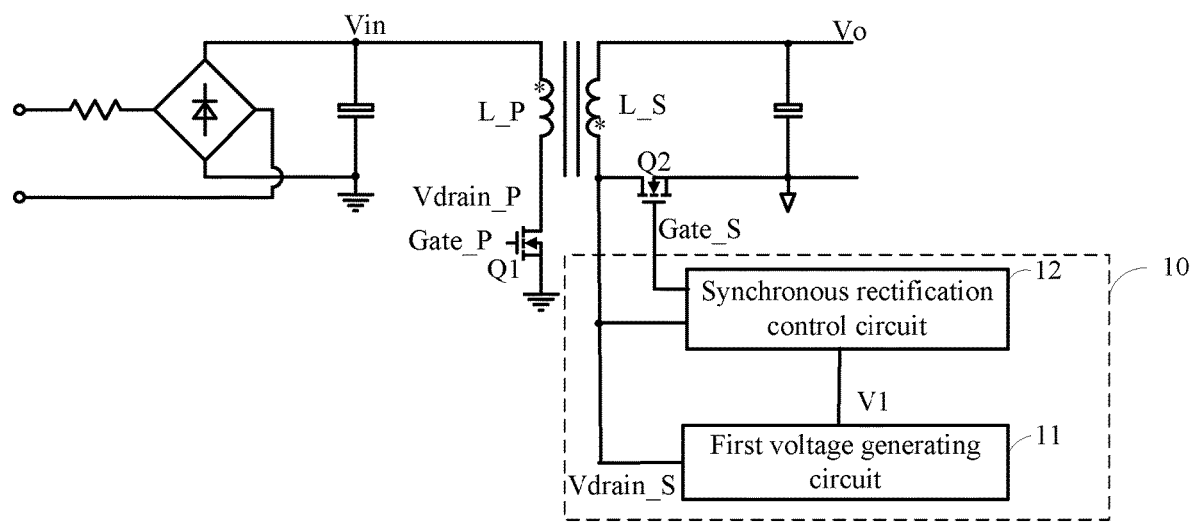
FIG. 2 is a schematic block diagram of an example flyback converter including a switching control circuit, in accordance with embodiments of the present invention.

Referring now to FIG. 2, shown is a schematic block diagram of an example flyback converter including a switching control circuit, in accordance with embodiments of the present invention. In this particular example, the flyback converter can include a rectifier circuit for rectifying the AC input voltage to obtain a DC input voltage, a transformer including primary winding L_P and secondary winding L_S, main switch Q1 coupled to primary winding L_P, rectifier switch Q2 coupled to secondary winding L_S, and switching control circuit 10. Primary winding L_P and the parasitic capacitor of main switch Q1 can resonate during operation. In one example, an auxiliary winding can receive a resonance signal of the primary side and input it to a primary control circuit to turn on main switch Q1. Main switch Q1 can be controlled to turn on at the lowest point of the resonance signal of the primary side. In addition, the on-time of main switch Q1 can be determined by the output voltage feedback loop. An output voltage feedback signal generated in accordance with a signal representing output voltage Vo of the flyback converter may be input to the primary control circuit in order to turn off main switch Q1.

Switching control circuit 10 can include voltage generating circuit 11 and synchronous rectification control circuit 12. For example, voltage generating circuit 11 can include a sample-and-hold circuit for sampling and holding drain-source voltage Vdrain_S of rectifier switch Q2 when main switch Q1 is turned on, in order to generate voltage sampling signal V1 representing information of input voltage Vin. For example, drain-source voltage Vdrain_S of rectifier switch Q2 may be related to input voltage Vin and output voltage Vo, so voltage sampling signal V1 can be drain-source voltage Vdrain_S of rectifier switch Q2, and also may be a voltage proportional to drain-source voltage Vdrain_S of rectifier switch Q2 (e.g., 0.85*Vdrain_S). Synchronous rectification control circuit 12 can adjust the on-time of rectifier switch Q2 according to voltage sampling signal V1, in order to adjust the absolute value of the negative current flowing through the secondary winding. The negative current can discharge the parasitic capacitor of main switch Q1 to reduce the drain-source voltage of main switch Q1.

For example, synchronous rectification control circuit 12 can sample drain-source voltage Vdrain_S of rectifier switch Q2 after rectifier switch Q2 is turned off for predetermined time Td, in order to obtain voltage sampling signal V2. When voltage sampling signal V2 is lower than voltage sampling signal V1, the on-time of rectifier switch Q2 can be increased in the next cycle to increase the absolute value of the negative current flowing through the secondary winding. In addition, when voltage sampling signal V2 is greater than voltage sampling signal V1, the on-time of rectifier switch Q2 can be decreased in the next cycle, in order to decrease the absolute value of the negative current flowing through the secondary winding. Further, synchronous rectification control circuit 12 may adjust the on-time of rectifier switch Q2 by adjusting the turn-off moment of rectifier switch Q2. In one example, predetermined time Td may approach a half resonance period, where the resonance period refers to a period of resonance generated between primary winding L_P and the parasitic capacitor of main switch Q1.

In particular embodiments, a switching control circuit capable of adaptively controlling the absolute value of the negative current flowing through the secondary winding is provided. In addition, the main switch can realize ZVS under conditions of a high input voltage or a low input voltage. The negative current can be small or equal to 0 when the input voltage is low, and the negative current may be large when the input voltage is high.

Figure 3:
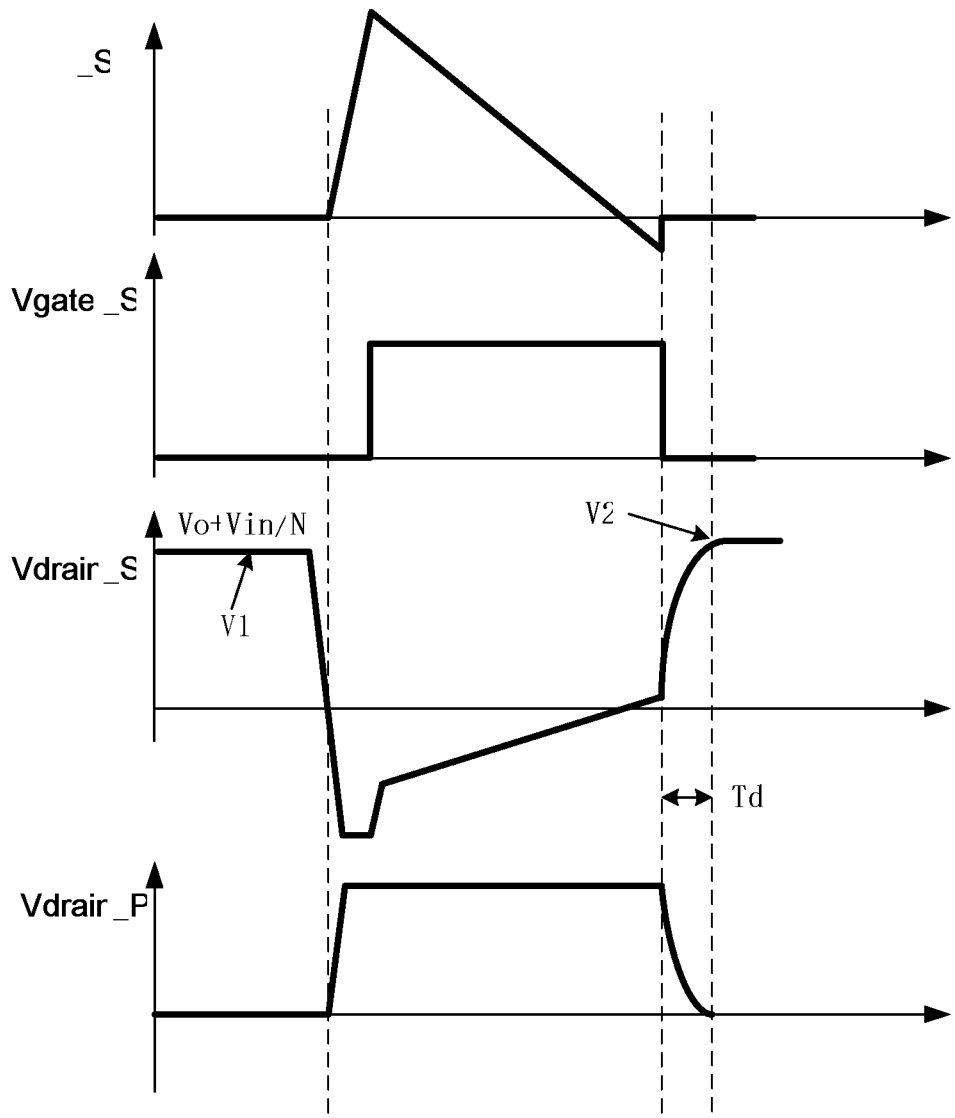
FIG. 3 is a waveform diagram of example operation of a flyback converter including a switching control circuit, in accordance with embodiments of the present invention.

Referring now to FIG. 3, shown is a waveform diagram of example operation of a flyback converter including a switching control circuit, in accordance with embodiments of the present invention. In this particular example, voltage generating circuit 11 can be configured for sampling and holding drain-source voltage Vdrain_S of rectifier switch Q2 when main switch Q1 is turned on, in order to generate voltage sampling signal V1. For example, drain-source voltage Vdrain_S of rectifier switch Q2 can be sampled and held after main switch Q1 is turned on for a blanking time, in order to eliminate the influence of the spike voltage on the sampling accuracy. Due to the real-time sampling, drain-source voltage Vdrain_S of rectifier switch Q2 may be maintained at the amplitude Vo+Vin/N when main switch Q1 is turned on, where N is the turns ratio of the primary and secondary sides. Therefore, voltage sampling signal V1 can change when input voltage Vin changes. When input voltage Vin is low, voltage sampling signal V1 may be low, and when input voltage Vin is high, and voltage sampling signal V1 can also be high. That is, voltage sampling signal V1 can change in a positive correlation with the change of input voltage Vin.

Further, synchronous rectification control circuit 12 can sample drain-source voltage Vdrain_S of rectifier switch Q2 after rectifier switch Q2 is turned off for predetermined time Td, in order to obtain voltage sampling signal V2. Since predetermined time Td approaches a half resonance period, drain-source voltage Vdrain_S of rectifier switch Q2 may reach the maximum value when rectifier switch Q2 is turned off for predetermined time Td. Due to the mutual inductance of the primary and secondary windings, drain-source voltage Vdrain_P of main switch Q1 can resonate to the lowest point at this time.

In particular embodiments, voltage sampling signal V1 can be used as a reference and compared against voltage sampling signal V2. When voltage sampling signal V2 is lower than voltage sampling signal V1 (e.g., drain-source voltage Vdrain_S of rectifier switch Q2 is lower than the reference at the bottom of resonance) and drain-source voltage Vdrain_P of main switch Q1 is high at this time which indicates the inductor of primary winding L_P and the parasitic capacitor of main switch Q1 do not resonate to zero, the on-time of rectifier switch Q2 can be increased in the next cycle to increase the absolute value of the negative current flowing through the secondary winding. The negative current in the secondary side may be transferred to the primary side to speed up the discharge of the parasitic capacitor of the main switch Q1, such that the inductor of primary winding L_P and the parasitic capacitor of main switch Q1 can resonate to zero in the next cycle, in order to realize the zero-voltage switch of main switch Q1.

When voltage sampling signal V2 is greater than voltage sampling signal V1 (e.g., drain-source voltage Vdrain_S of rectifier switch Q2 is greater than the reference at the bottom of resonance) and drain-source voltage Vdrain_P of main switch Q1 is low at this time which indicates the inductor of primary winding L_P and the parasitic capacitor of main switch Q1 can resonate to zero, the on-time of rectifier switch Q2 can be decreased in the next cycle to decrease the absolute value of the negative current flowing through the secondary winding, in order to realize the zero-voltage switch of main switch Q1.

In particular embodiments, the switching control circuit may generate a voltage sampling signal V1 representing the input voltage information, and adjust the on-time of the rectifier switch according to the changing state of the voltage sampling signal, in order to adjust the absolute value of the negative current flowing through the secondary winding. The negative current can discharge the parasitic capacitor of the main switch in order to reduce the drain-source voltage of the main switch. For example, the drain-source voltage of the rectifier switch may be sampled and used as a reference when the main switch is turned on, and the drain-source voltage of the rectifier switch can be sampled after the rectifier switch is turned off for near a half resonance period. The sampled drain-source voltage of the rectifier switch can be compared against the reference. If the sampled drain-source voltage of the rectifier switch is lower than the reference, the on-time of the rectifier switch may be increased to increase the absolute value of the negative current flowing through the secondary winding. The negative current in the secondary side can be transferred to the primary side to speed up the discharge of the parasitic capacitor of the main switch. If the sampled drain-source voltage of the rectifier switch is higher than the reference, the on-time of the rectifier switch may be decreased to decrease the absolute value of the negative current flowing through the secondary winding. In this way, the main switch can realize ZVS under conditions of different input voltages, the large loop current in the primary side may not be generated due to the appropriate negative current, and adaptive control can be realized.

Figure 4:
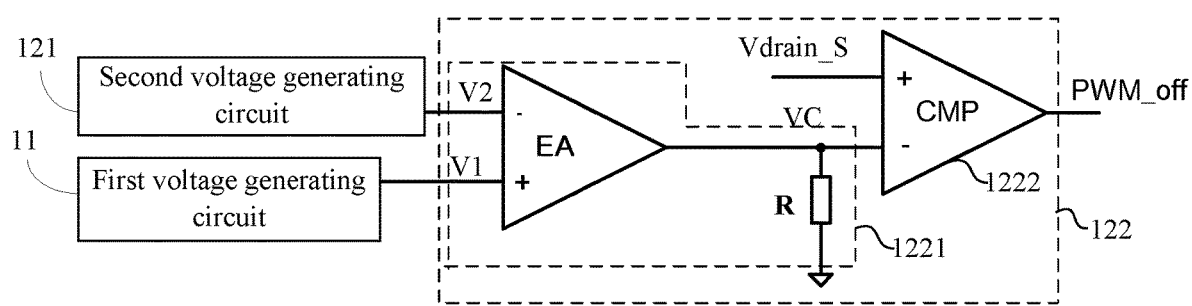
FIG. 4 is a schematic block diagram of an example synchronous rectification control circuit, in accordance with embodiments of the present invention.

Referring now to FIG. 4, shown is a schematic block diagram of an example synchronous rectification control circuit, in accordance with embodiments of the present invention. This example of the synchronous rectification control circuit can increase a turn-off threshold of rectifier switch Q2 in the next cycle to increase the absolute value of the negative current flowing through the secondary winding when voltage sampling signal V2 is lower than voltage sampling signal V1. The synchronous rectification control circuit can also decrease the turn-off threshold of rectifier switch Q2 to decrease the absolute value of the negative current flowing through the secondary winding when voltage sampling signal V2 is higher than voltage sampling signal V1.

In this example, synchronous rectification control circuit 12 can include second voltage generating circuit 121 and adjustment circuit 122. Adjustment circuit 122 can include error compensation circuit 1221 and on-time control circuit 1222. Voltage generating circuit 121 can sample drain-source voltage Vdrain_S of rectifier switch Q2 after rectifier switch Q2 is turned off for predetermined time Td to obtain voltage sampling signal V2. Adjustment circuit 122 can obtain a comparison result by comparing voltage sampling signal V2 and voltage sampling signal V1, and may adjust the on-time of rectifier switch Q2 according to the comparison result.

Error compensation circuit 1221 can generate error compensation signal VC according to voltage sampling signals V1 and V2. For example, error compensation circuit 1221 can include error amplifier EA and a compensation circuit. The first and second input terminals of error amplifier EA can respectively receive voltage sampling signals V1 and V2, and the output terminal of error amplifier EA may output an error signal. The error signal can be compensated by the compensation circuit to obtain error compensation signal VC. It should be understood that the compensation circuit is not limited to only being a resistor, but can be formed by a capacitor or other suitable combinations of capacitors and resistors.

On-time control circuit 1222 can turn off rectifier switch Q2 when drain-source voltage Vdrain_S of rectifier switch Q2 reaches error compensation signal VC during the on-time of rectifier switch Q2, thereby adjusting the absolute value of the negative current flowing through the secondary winding by adjusting the on-time of rectifier switch Q2. That is, error compensation signal VC can be used as the turn-off threshold of rectifier switch Q2. For example, on-time control circuit 1222 can include comparator CMP having first and second input terminals that respectively receive drain-source voltage Vdrain_S of rectifier switch Q2 and error compensation signal VC, and the output terminal can output shutdown signal PWM_off to turn off rectifier switch Q2.

In this example, voltage sampling signal V1 may be used as a reference and compared against voltage sampling signal V2. Error compensation signal VC can increase when voltage sampling signal V2 is lower than voltage sampling signal V1; that is, the turn-off threshold of rectifier switch Q2 is increased. Also, the time duration that drain-source voltage Vdrain_S of rectifier switch Q2 reaches error compensation signal VC can become longer during the on-time of rectifier switch Q2, thereby increasing the on-time of rectifier switch Q2 to increase the absolute value of the negative current flowing through the secondary winding generated by the secondary side. The negative current in the secondary side may be transferred to the primary side to speed up the discharge of the parasitic capacitor of main switch Q1, such that the inductor of primary winding L_P and the parasitic capacitor of main switch Q1 in the next cycle can resonate to zero to realize the ZVS of main switch Q1.

Error compensation signal VC can decrease when voltage sampling signal V2 is higher than voltage sampling signal V1. That is, the turn-off threshold of rectifier switch Q2 can be decreased, and the time duration that drain-source voltage Vdrain_S of rectifier switch Q2 reaches error compensation signal VC may become shorter during the on-time of rectifier switch Q2. This can decrease the on-time of rectifier switch Q2 to decrease the absolute value of the negative current flowing through the secondary winding generated by the secondary side, and the large loop current in the primary side may not be generated.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A switching control circuit for a flyback converter having a main switch coupled to a primary winding of a transformer and a rectifier switch coupled to a secondary winding of the transformer, the switching control circuit comprising:
   a) a first voltage generating circuit configured to generate a first voltage sampling signal representing information of an input voltage;
   b) a synchronous rectification control circuit configured to adjust an on-time of the rectifier switch according to a comparison result from an adjustment circuit that compares the first voltage sampling signal against a second voltage sampling signal, in order to adjust an absolute value of a negative current flowing through the secondary winding, wherein the synchronous rectification control circuit comprises a second voltage generating circuit configured to sample a drain-source voltage of the rectifier switch after the rectifier switch is turned off for a predetermined time to generate the second voltage sampling signal; and c) wherein the negative current is configured to discharge a parasitic capacitor of the main switch in order to reduce a drain-source voltage of the main switch.

2. The switching control circuit of claim 1, wherein the main switch is turned on when the drain-source voltage of the main switch resonates to a lowest value.

3. The switching control circuit of claim 1, wherein the synchronous rectification control circuit is configured to:
   a) increase the on-time of the rectifier switch to increase the absolute value of the negative current flowing through the secondary winding when the input voltage increases; and
   b) decrease the on-time of the rectifier switch to decrease the absolute value of the negative current flowing through the secondary winding when the input voltage decreases.

4. The switching control circuit of claim 1, wherein the synchronous rectification control circuit is configured to obtain a changing state of the input voltage according to the first voltage sampling signal, and to adjust the on-time of the rectifier switch by adjusting a turn-off moment of the rectifier switch.

5. The switching control circuit of claim 1, wherein the first voltage generating circuit is configured to generate the first voltage sampling signal according to a drain-source voltage of the rectifier switch.

6. The switching control circuit of claim 1, wherein the first voltage generating circuit is configured as a sample-and-hold circuit for sampling and holding a drain-source voltage of the rectifier switch while the main switch is turned on to obtain the first voltage sampling signal.

7. The switching control circuit of claim 1, wherein the adjustment circuit is configured to:
   a) increase the on-time of the rectifier switch in a next cycle when the second voltage sampling signal is lower than the first voltage sampling signal; and
   b) decrease the on-time of the rectifier switch in the next cycle when the second voltage sampling signal is higher than the first voltage sampling signal.

8. The switching control circuit of claim 1, wherein the adjustment circuit is configured to:
   a) increase a turn-off threshold of the rectifier switch when the second voltage sampling signal is lower than the first voltage sampling signal; and
   b) decrease the turn-off threshold of the rectifier switch in a next cycle when the second voltage sampling signal is higher than the first voltage sampling signal.

9. The switching control circuit of claim 1, wherein the adjustment circuit comprises:
   a) an error compensation circuit configured to generate an error compensation signal according to the first and second voltage sampling signals; and
   b) an on-time control circuit configured to turn off the rectifier switch when the drain-source voltage of the rectifier switch reaches the error compensation signal during the on-time of the rectifier switch, in order to adjust the on-time of the rectifier switch.

10. The switching control circuit of claim 9, wherein the error compensation circuit comprises:
    a) an error amplifier configured to generate an error signal according to the first and second voltage sampling signals; and
    b) a compensation circuit configured to generate the error compensation signal by compensating the error signal.

11. The switching control circuit of claim 9, wherein the on-time control circuit comprises a comparator having first and second input terminals for respectively receiving the drain-source voltage of rectifier switch and the error compensation signal, and an output terminal for generating a shutdown signal to turn off the rectifier switch.

12. The switching control circuit of claim 1, wherein the predetermined time approaches a half resonance period, and the resonance period is configured as a period of resonance generated between an inductor of the primary winding and the parasitic capacitor of the main switch.

13. A switching control method for a flyback converter having a main switch coupled to a primary winding of a transformer and a rectifier switch coupled to a secondary winding of the transformer, the method comprising:
    a) generating a first voltage sampling signal representing information of an input voltage;
    b) adjusting an on-time of the rectifier switch according to the first voltage sampling signal to adjust an absolute value of a negative current flowing through the secondary winding;
    c) discharging, by the negative current, a parasitic capacitor of the main switch to reduce a drain-source voltage of the main switch;
    d) sampling a drain-source voltage of the rectifier switch after the rectifier switch is turned off for a predetermined time to generate a second voltage sampling signal;
    e) generating a comparison result by comparing the second voltage sampling signal and the first voltage sampling signal; and
    f) adjusting the on-time of the rectifier switch according to the comparison result.

14. The method of claim 13, wherein the main switch is turned on when the drain-source voltage of the main switch resonates to a lowest value.

15. The method of claim 13, further comprising:
    a) increasing the on-time of the rectifier switch to increase the absolute value of the negative current flowing through the secondary winding when the input voltage increases; and
    b) decreasing the on-time of the rectifier switch to decrease the absolute value of the negative current flowing through the secondary winding when the input voltage decreases.

16. The method of claim 13, further comprising:
    a) obtaining a changing state of the input voltage according to the first voltage sampling signal; and
    b) adjusting the on-time of the rectifier switch by adjusting a turn-off moment of the rectifier switch.

17. The method of claim 13, further comprising generating the first voltage sampling signal according to a drain-source voltage of the rectifier switch.

18. The method of claim 13, further comprising generating the first voltage sampling signal by sampling and holding a drain-source voltage of the rectifier switch when the main switch is turned on.

* * * * *